United States Patent [19]
Ueda et al.

[11] Patent Number: 5,317,679
[45] Date of Patent: May 31, 1994

[54] DIGITAL IMAGE PROCESSOR INCLUDING CORRECTION FOR UNDESIRABLE EDGE EMPHASIS IN OUTLINE-DEMARCATED FONTS

[75] Inventors: Naofumi Ueda, Urayasu; Hiroaki Suzuki, Yokohama, both of Japan

[73] Assignee: Ricoh Company, Ltd., Tokyo, Japan

[21] Appl. No.: 31,916

[22] Filed: Mar. 16, 1993

Related U.S. Application Data

[63] Continuation of Ser. No. 654,530, Feb. 13, 1991, abandoned.

[30] Foreign Application Priority Data

Feb. 21, 1990 [JP] Japan .................. 2-16312[U]
Oct. 9, 1990 [JP] Japan .................. 2-270990

[51] Int. Cl.⁵ .................................. G06F 7/00
[52] U.S. Cl. .......................... 395/132; 395/128
[58] Field of Search ............ 395/132, 131, 150, 151; 340/729, 730

[56] References Cited

U.S. PATENT DOCUMENTS

| | | | |
|---|---|---|---|
| 4,607,340 | 8/1986 | Nagai | 395/143 |
| 4,992,780 | 2/1991 | Penna et al. | |
| 5,029,108 | 7/1991 | Lung | 364/519 |

OTHER PUBLICATIONS

"Pixel–Scan–Line Conversion (2) Concerning Polygons," The Information Center, No. 16, Jan. 1984, pp. 136–141.

"The Journal of the Institute of Image Electronics Engineers of Japan," vol. 18, No. 3, Jun. 1989, pp. 92–165.

"Practice Computer Graphics Basis and Application," *Fujio Yamaguchi*, pp. 114–125.

*Primary Examiner*—Gary V. Harkcom
*Assistant Examiner*—Michael S. Smith
*Attorney, Agent, or Firm*—Mason, Fenwick & Lawrence

[57] ABSTRACT

A digital image processor generates a digital signal responsive to an image signal representing a predetermined font demarcated by an outline, by which digital signal a digital image corresponding to the predetermined font is expressed on picture elements by using the luminance of each picture element, the digital image processor using a matrix having matrix elements corresponding to the picture elements, on which matrix the predetermined font can be expressed. The digital image processor digitalizes the image signal to determine the luminance of each picture element by using the matrix and an antialiasing process. The digital image processor compares first luminance of a first matrix element traversing the outline of the predetermined font with second luminance of a second matrix element completely inside the outline of the predetermined font and third luminance of a third matrix element outside the predetermined font, and corrects the first luminance, if the first luminance is the highest among the first, second and third luminance, so that the first luminance is not the highest among the first, second and third luminance.

7 Claims, 10 Drawing Sheets

FIG.5

OUTLINE OF FONT

| c | c | c | a | b | b | b | b | b | b |
|---|---|---|---|---|---|---|---|---|---|
| c | c | c | a | a | b | b | b | b | b |
| c | c | c | c | a | b | b | b | b | b |
| c | c | c | c | a | b | b | b | b | b |
| c | c | c | c | a | a | b | b | b | b |
| c | c | c | c | c | a | b | b | b | b |
| c | c | c | c | c | a | a | b | b | b |
| c | c | c | c | c | c | a | b | b | b |
| c | c | c | c | c | c | a | b | b | b |

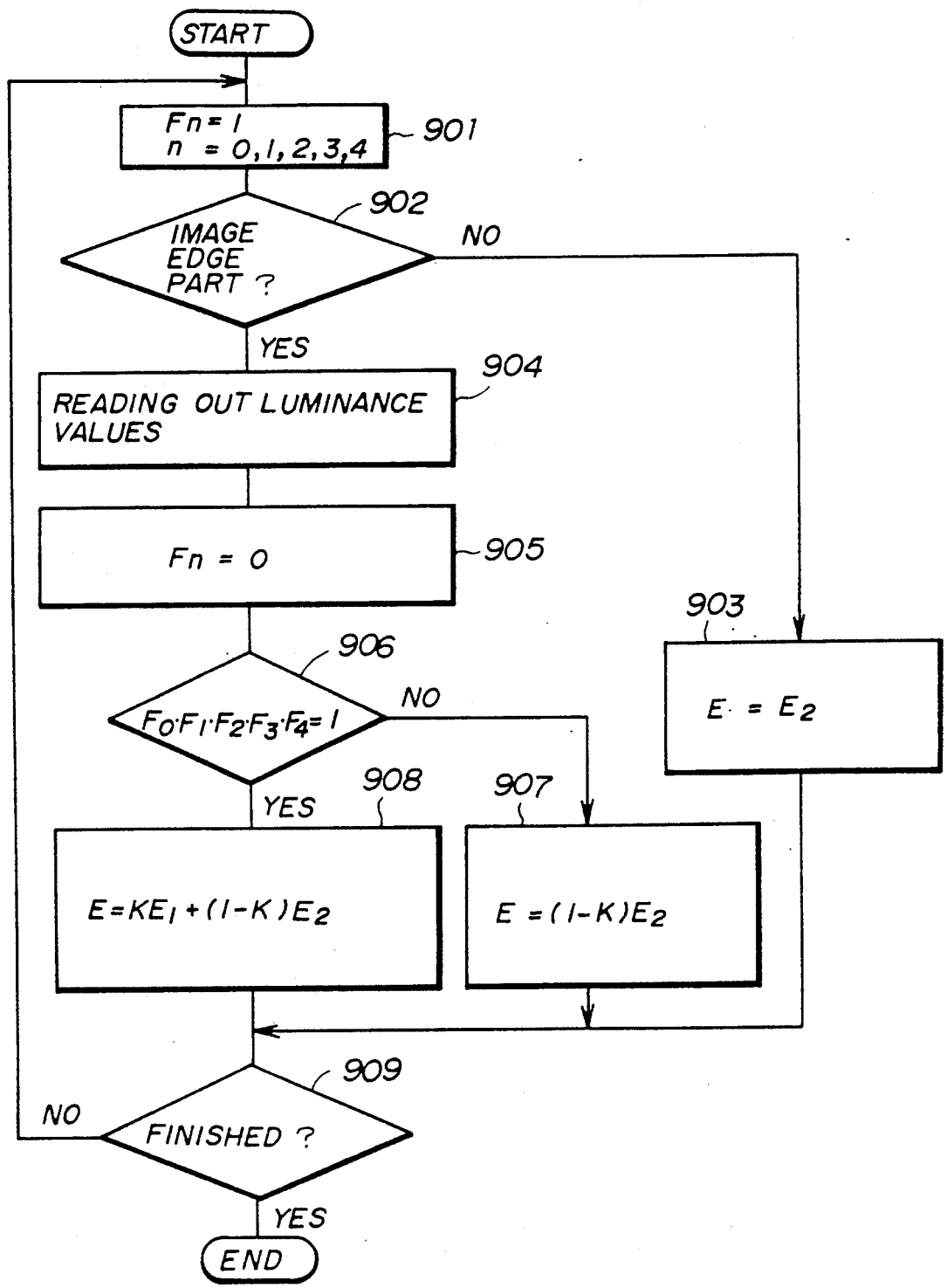

DIGITAL IMAGE PROCESSOR INCLUDING CORRECTION FOR UNDESIRABLE EDGE EMPHASIS IN OUTLINE-DEMARCATED FONTS

This application is a continuation of U.S. patent application Ser. No. 07/654,530, filed Feb. 13, 1991, now abandoned.

BACKGROUND OF THE INVENTION

The present invention relates generally to digital image processors which digitalize an image signal representing a predetermined font to express a digital image corresponding to the predetermined font on matrically-arranged picture elements by using the luminance of each picture element (abbreviated pixel hereinafter), and more particularly to a digital image processor which determines the luminance of each pixel based on an antialiasing process by using a matrix having matrix elements corresponding to the picture elements, on which matrix the predetermined font is expressed. Therefore, the luminance of each picture element is determined by calculating the luminance of a corresponding matrix element, and the luminance of each matrix element is calculated in accordance with an antialiasing process. The term "antialiasing process", as used herein, means a process which proportions the luminance of each matrix element to an area ratio of an area to be covered by the predetermined font in a corresponding matrix element for an area of the corresponding matrix element in order to smooth jagged edges of the digital image. Hereupon, the predetermined font is generally referred to as an outline vector font according to the Outline Vector Format. In the Outline Vector Format, an outline of a font is relatively numerically expressed, and thus the inside demarcated by the outline is drawn with straight and curved lines, as described in "PIXEL", No.16, January, 1984, Scan-line Conversion (2) concerning Polygons, pp.136–141, published by the Information Center. The antialiasing process is generally used for Disk Top Publishing (called DTP for short).

With the recent spread of DTP, as described in "The Journal of the Institute of Image Electronics Engineers of Japan", Vol.18, No.3, June 1989, the use of an outline vector font as a font for the DTP has also spread. The outline vector font represents uniquely designed letters and figures expressed by straight and curved lines representing the outline thereof instead of by dot patterns. The outline vector font originally includes little aliasing when expressed on pixels as a digital image. The term, "aliasing", as used herein, means that an edge of the font is jagged. But if an antialiasing process is further performed on the digital image, it includes less aliasing. The term "an antialiasing process", as used herein, means a process to removing aliasing, that is, smoothing a jagged edge of the digital image. There are at least two kinds of antialiasing process, as described in "Practice Computer Graphics Basis and Application" edited by Fujio Yamaguchi and translated by SEIKO Electro-engineering Inc. Electronic Division. One kind thereof infinitesimally reduces each pixel. But there is a limit how much a pixel can be reduced. Accordingly, a description will now be given of another kind of antialiasing process, with reference to FIGS. 1(A), 1(B), 2, 3(A), 3(B), 3(C) and 3(D).

The antialiasing process, to which the present invention is to be applied, is a process to shade the jagged edges off by means of proportioning the luminance of each pixel to an area ratio of area to be covered by the predetermined font in a pixel for the pixel area, as shown in FIGS. 1(A) and 1(B). FIG. 1(A) shows jagged edges, which look like four tiers, and FIG. 1(B) shows corresponding smoothed edges, thus look like a parallelogram, after the antialiasing process is performed to the jagged edges. To be concrete, as shown in FIG. 2, a luminance value E representing the luminance of a pixel R is defined as follows:

$$E = [(A_2 * E_1) + (A_1 * E_2)]/(A_1 + A_2) \qquad (X)$$
$$= k * E_1 + (1 - k) * E_2$$

hereupon, $A_1$; area of an image part $R_1$, $A_2$; area of a non-image part $R_2$, $E_1$; a luminance value of the pixel R before drawing the image, $E_2$; a luminance value of the image part $R_1$, k; $A_2/(A_1+A_2)$, an area ratio of the area of the non-image part for the area of the pixel R The term "an image part", as used herein, means a group of pixels which include a part of a digital image, and the term "a non-image part" means another group thereof exclusive of the image part. In addition, pixels which belong to the image part and are to be traversed by an outline of a font are classified as "an image edge part", hereinafter.

However, the above antialiasing process has the following disadvantage in that the image edge part is emphasized. Hereupon, the term "the image edge part is emphasized", as used herein, means that the luminance of the image edge part is the highest among that of the image part, the non-image part, and the image edge part, so that the jagged edge is not successfully smoothed. Basically, the image edge part is not emphasized when the luminance of the image edge part is lower than that of the image part. But, even when the luminance of the image edge part is higher than that of the image part, if the luminance of the image edge part is lower than that of the non-image part, it may be considered that the image part is not emphasized. When expressing an outline vector font on sixteen pixels, the outline of the font seem to divide the pixels into two kinds of parts; an image part and a non-image part, as shown in FIG. 3(A). But, since a pixel cannot be divided into two kinds of parts, each of the pixels are actually partitioned into three kinds of parts; an image part, an image edge part, and a non-image part, as shown in FIG. 3(B). When it is assumed that a luminance value $E_2$ is 100 and a luminance value $E_1$ is 0, a luminance value of the image part is 100, because $A_2$ is 0 in the quotation (X), and a luminance value of the non-image part is 0. On the other hand, a luminance value E of the image edge part is calculated from the quotation (X) as follows, since k is found to be ½ from FIG. 3(B):

$$E = (\tfrac{1}{2})*0 + (\tfrac{1}{2})*100 = 50$$

However, since the antialiasing process fixes the luminance value of each pixel on the basis of the previous luminance value $E_1$, there is a case where the luminance of the image edge part is the highest of the three kinds of parts of the pixels. For example, if a font having a luminance value 10 and shaped the same as FIG. 3(B) is superimposed on that in FIG. 3(B), it is expected that the luminance value of the image edge part will not be the highest of the above three kinds of parts, for example, 5, as shown in FIG. 3(C). But, actually, the luminance value of the image part is 10 and the luminance value of the non-image part is 0, whereas the luminance value E of the image edge part is calculated by $E_1$ is 50, $E_2$ is 10, k is $\frac{1}{2}$:

$$E = (\tfrac{1}{2})^*50 + (\tfrac{1}{2})^*10 = 30$$

Thus, contrary to the above expectation, the luminance value of the image edge part becomes the highest of the above three kinds of parts so that the image edge part is emphasized. This disadvantage may occur when deleting a previously-drawn image by means of a luminance value 0.

SUMMARY OF THE INVENTION

Accordingly it is a general object of the present invention to provide a novel and useful digital image processor in which the above disadvantage is eliminated.

Another object of the present invention is to provide a digital image processor in which jagged edges of a digital image are always successfully smoothed.

Another more specific object of the present invention is to provide a digital image processor which generates a digital signal responsive to an image signal representing a predetermined font demarcated by an outline, by which digital signal a digital image corresponding to the predetermined font is expressed on picture elements matrically arranged by using the luminance of each picture element, the digital image processor using a matrix having matrix elements corresponding to the picture elements, on which matrix the predetermined font can be expressed, which digital image processor comprises digitalization means, responsive to the image signal, for generating the digital signal which determines the luminance of each picture element by using the matrix so that the luminance of each picture element is determined by calculating the luminance of each corresponding matrix element, the luminance of each matrix element being calculated in accordance with an antialiasing process which proportion the luminance of each matrix element to an area ratio of an area covered by the predetermined font in a corresponding matrix element for an area of the corresponding matrix element, and correction means, coupled to the digitalization means, for comparing first luminance of a first matrix element traversing the outline of the predetermined font with second luminance of a second matrix element completely inside the outline of the predetermined font and third luminance of a third matrix element outside the predetermined font, and for correcting the first luminance, if the first luminance is the highest among the first, second and third luminance, so that the first luminance is not the highest among the first, second and third luminance, the digital signal being corrected accordingly when the first luminance is corrected.

Still another more specific object of the present invention is to provide a digital image processor which generates a digital signal responsive to an image signal representing a predetermined font demarcated by an outline, by which digital signal a digital image corresponding to the predetermined font is expressed on picture elements matrically arranged by using the luminance of each picture element, the digital image processor using a matrix having matrix elements corresponding to the picture elements, on which matrix the predetermined font can be expressed, which digital image processor comprises judging means for judging, after a first font is expressed on the matrix, and then the second font is subsequently expressed on the matrix, whether or not a predetermined matrix element traverses both respective outlines of the first and second fonts, and digitalization means, responsive to the image signal and the judging means, for generating the digital signal which determines the luminance of each picture element by using the matrix so that the luminance of each picture element is determined by calculating the luminance of a corresponding matrix element, the luminance of each matrix element being calculated in accordance with an antialiasing process which proportions the luminance of each matrix element to an area ratio of an area covered by the predetermined font in a corresponding matrix element for an area of the corresponding matrix element, the digitalization means taking the first font into consideration when calculating the luminance of the predetermined matrix element if the judging means judges the predetermined matrix element does not traverse both outlines thereof, and not taking the first font into consideration when calculating the luminance of the predetermined matrix element if the judging means judges the predetermined matrix element traverses both outlines thereof so that the luminance of the predetermined element is successfully proportioned to an area ratio of an area covered by the second font in the predetermined matrix element for an area of the predetermined matrix element.

According to one aspect of the present invention, the luminance of the matrix element is not the highest among that of the first, second and third matrix elements. Therefore, the luminance of a first picture element corresponding to the first matrix element is not the highest among the first, second and third picture elements so that jagged edges of a digital image are always successfully smoothed.

According to another aspect of the present invention, the the luminance of the predetermined element is successfully proportioned to an area ratio of area covered by the second font in the predetermined matrix element for area of the predetermined matrix element. Therefore, jagged edges of a digital image are always successfully smoothed.

Other objects and further features of the present invention will be apparent from the following detailed description when read in conjunction with the accompanying drawings.

BRIEF DESCRIPTION OF THE DRAWINGS

FIG. 5 shows a matrix stored in a page memory;

FIGS. 11(a), 11(b), and 11(c), and 12 explain how to determine a luminance value of each matrix element.

DESCRIPTION OF THE PREFERRED EMBODIMENTS

Figure 4:
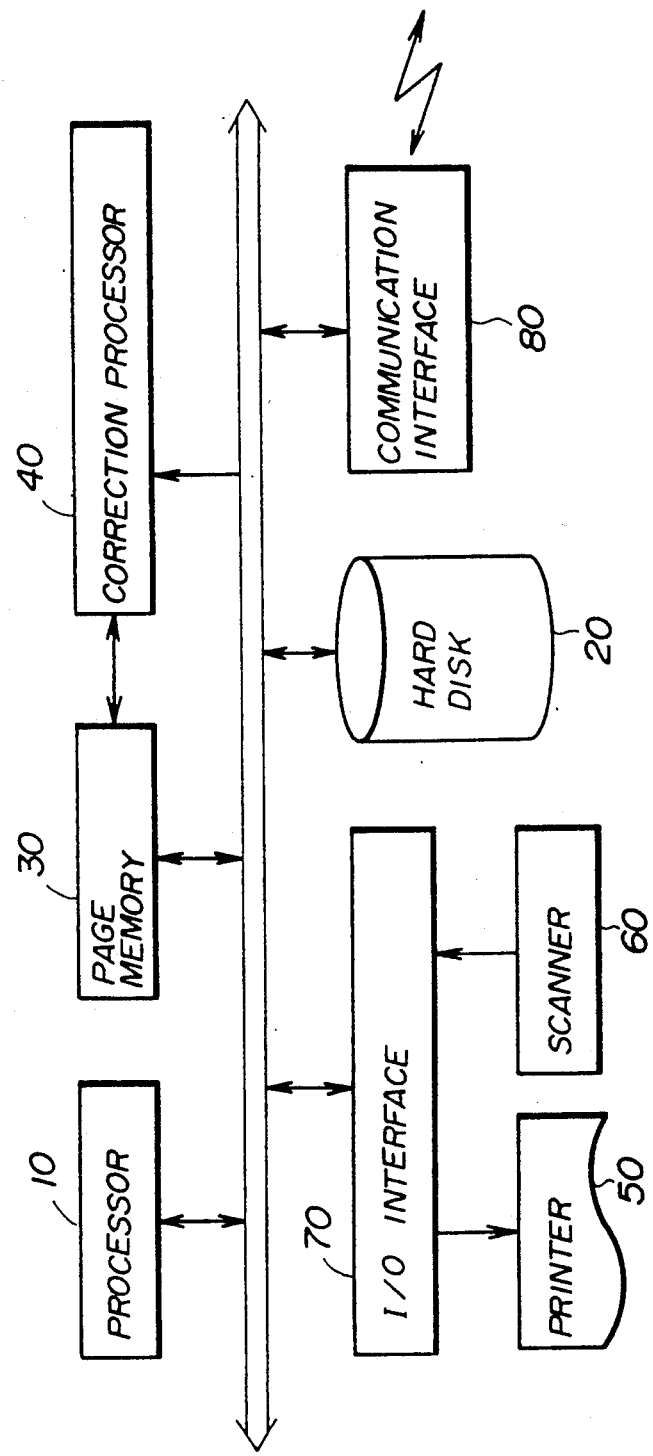
FIG. 4 shows a block diagram of a digital image processor of a first embodiment according to the present invention.

As shown in FIG. 4, a digital image processor of a first embodiment according to the present invention comprises a processor 10, a hard disk 20, a page memory 30, a correction processor 40, a printer 50, a scanner 60, an I/O interface 70, and a communication interface 80. The processor 10, the hard disk 20, the page memory 30, the correction processor 40, the I/O interface, and the communication interface 80 are coupled to each other via a system bus. The printer 50 and the scanner 60 are respectively connected to the system bus via the I/O interface 70.

The digital image processor according to the present invention generates a digital signal responsive to an image signal representing a predetermined font demarcated by an outline, by which digital signal, a digital image corresponding to the predetermined font is expressed on pixels matrically arranged by using the luminance of each pixel. The predetermined font comprises the outline vector font. The digital signal determines the luminance of each pixel, which luminance is calculated based on the antialiasing process. However, if the image edge part is emphasized, the digital signal is corrected. In this embodiment, the processor 10 generates the digital signal, and the correction processor 40 corrects the digital signal.

The image signal may be supplied to the digital image processor via the communication interface 80, which may be a RS-232C so it can be digitalized. The digital image processor may generate an image signal by the scanner 60 and processor 10, and transmit it to another digital image processor via the communication interface 80. The digital image processor may comprise a display unit, not shown in FIG. 4, whose screen comprises a plurality f pixels. To generate the digital signal, the digital image processor uses a matrix having matrix elements corresponding to the pixels, on which matrix the predetermined font is expressed. In this embodiment, the matrix is stored in the page memory 30. Therefore, the luminance of each pixel is determined by calculating the luminance of corresponding matrix element. The luminance of each matrix element is calculated in accordance with the antialiasing process which proportions the luminance of each matrix element to an area ratio of area covered by the predetermined font in a corresponding matrix element for an area of the corresponding matrix element. Needless to say, the page memory 30 also stores the luminance of each matrix.

A description will now be given of the operation of the digital image processor.

When the image signal is transmitted via the communication interface 80, it is stored in the hard disk 20. The hard disk also stores several programs used for the processor 10. Next, the processor 10 digitalizes the image signal to generates the digital signal by using the matrix stored in the page memory 30. After the digitalization, the correction processor judges whether or not the luminance of the image edge part is lower than that of the image part. A description will now be given of the operation of the correction processor 40 with reference to FIGS. 4 to 6.

Figure 6A:
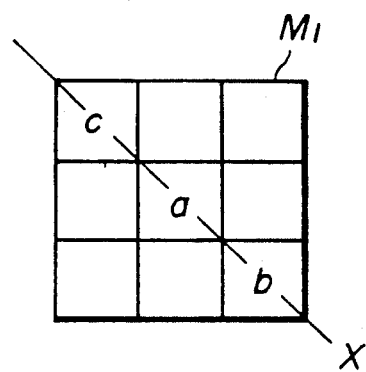
FIGS. 6A to 6D show four types of matrixes.
Figure 6B:
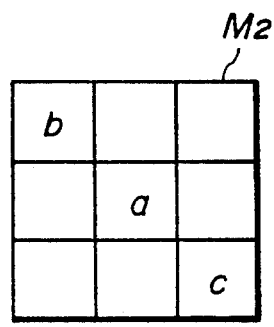
Figure 6C:
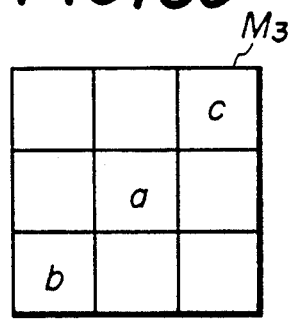
Figure 6D:
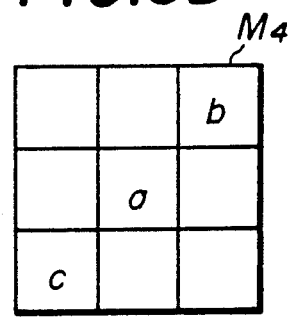
Figure 7A:
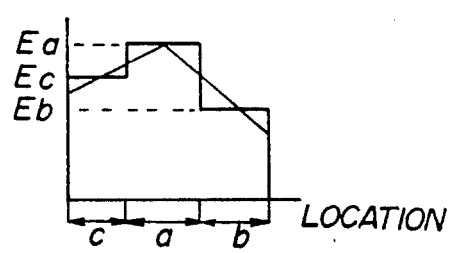
FIGS. 7A and 7B respectively show sections at Line X in FIG. 6A for explaining a relationship between a luminance value and the location of the matrix.
Figure 7B:
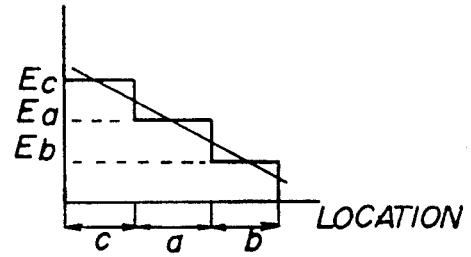

First, the correction processor 40 compares the luminance of the image edge part with that of the image part and that of the non-image part. The following information is supplied from the processor 10 to the correction processor 40; an address of each of the matrix elements traversed by the outline of the font, a direction of the outline thereof, and at which side of the outline the image part is located. This information is used for judging where the image part, the image edge part, and the non-image part are located. In addition, the luminance of each matrix element is supplied from the page memory 30 to the correction processor 40. It will now be assumed that the matrix shown in FIG. 5 is stored in the page memory 30. The correction processor 40 obtains the following information from the processor 10; each address of a corresponding image edge part "a", the direction of the outline extending from the bottom left to the top right, and the image part "b" located at the bottom side of the outline. As for the information furnished by the processor 10, four types of matrixes $M_1$, $M_2$, $M_3$, and $M_4$, as shown in FIGS. 6A to 6D, are conceivable. Therefore, one of the matrixes shown in FIGS. 6A to 6D is selected and furnished to the correction processor 40 as the information. After the correction processor 40 obtains the required information from the processor 10 and the page memory 30, the processor 40 compares the luminance value Ea of the image edge part "a" with that Eb of the image part "b" and that Ec of the non-image part. If the correction processor judges Ea is lower than Eb or Ec, Ea need not be corrected. In addition, even if Ea is higher than Eb, if Ea is lower than Ec, the image edge part is not emphasized. If Ea is not the highest of the above three kinds, the processor 10 may transmit the digital signal to another digital image processor via the communication interface 80, or output image appropriate to the digital image via the printer 50. FIGS. 7A and 7B, respectively corresponding to the sections at Line X in FIG. 6a, show a relationship between the luminance value and the location of the matrix. FIG. 7A shows the relationship where Ea>Ec≧22 Eb, and FIG. 7B shows the same where Ec>Ea≧Eb. As shown in FIG. 7A, when connecting mid points among "a", "b", and "c", a peak is formed at the middle of "a". In this case, "the image edge part is emphasized" is visualized. On the other hand, no peak is formed in FIG. 7B, and the luminance value gradually changes from "b" to "c". Therefore, "the image edge part is emphasized" is not visualized.

On the other hand, if the correction processor 40 judges Ea is the highest of the above three kinds, the correction processor 40 corrects Ea so that the image edge part is not emphasized. A description will now be given of the correcting of the correction processor 40. If Ea is the highest of the three kinds, relationships Ea>Eb>Ec, or Ea>Ec≧Eb are established. In this case, the correction processor 40 replaces Ea with Ec in the page memory 30. When Ea>Eb>Ec, replacing Ea with Ec makes Eb>Ea so that the image edge part is not emphasized. Moreover, when Ea>Ec≧Eb, replacing Ea with Ec makes Ec>Ea≧Eb so that the image edge part is not emphasized, as shown in FIG. 7B.

Figure 8:
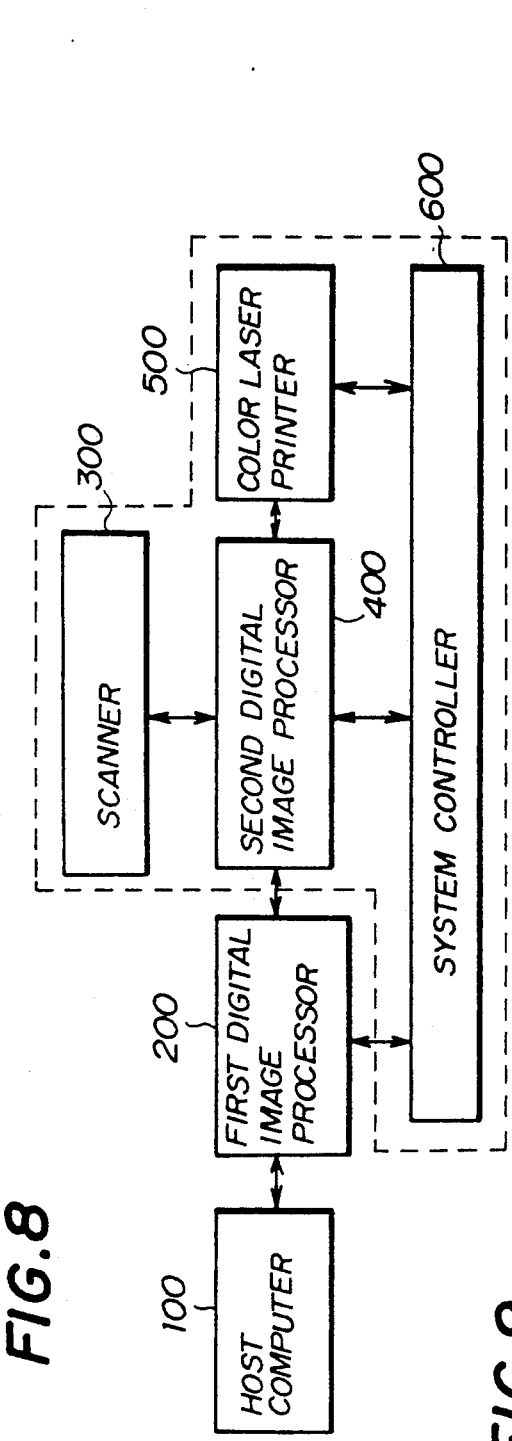
FIG. 8 shows a DTP system block diagram to which the present invention is applied.

FIG. 8 shows a DTP system block diagram to which the present invention is applied. The DTP system comprises a host computer 100, a first digital image processor 200, a scanner 300, a second digital image processor 400, a color laser printer 500, and a system controller 600. The present invention is applied to the first digital image processor 200. This DTP system can processes image signals from the first digital image processor 200 and the scanner 300. The host computer 100 forms a predetermined document written by Formatter Language and Page Description Language. The predetermined document is designed by the outline vector font. The host computer 100 transmits the image signal representing the document to the first image digital processor 200. The first digital image processor 200 generates a digital signal responsive to the image signal, and transmit it to the second digital image processor 400. The second digital image processor is connected to the scanner 300 and the color laser printer 500. THe color laser printer 500 prints out the document or a predetermined image scanned by the scanner 500. The system controller is coupled to the first and second digital image processors 200 and 400, and the color laser printer 500 to control their operations. The system may function as a digital copier or a printer.

Figure 9:
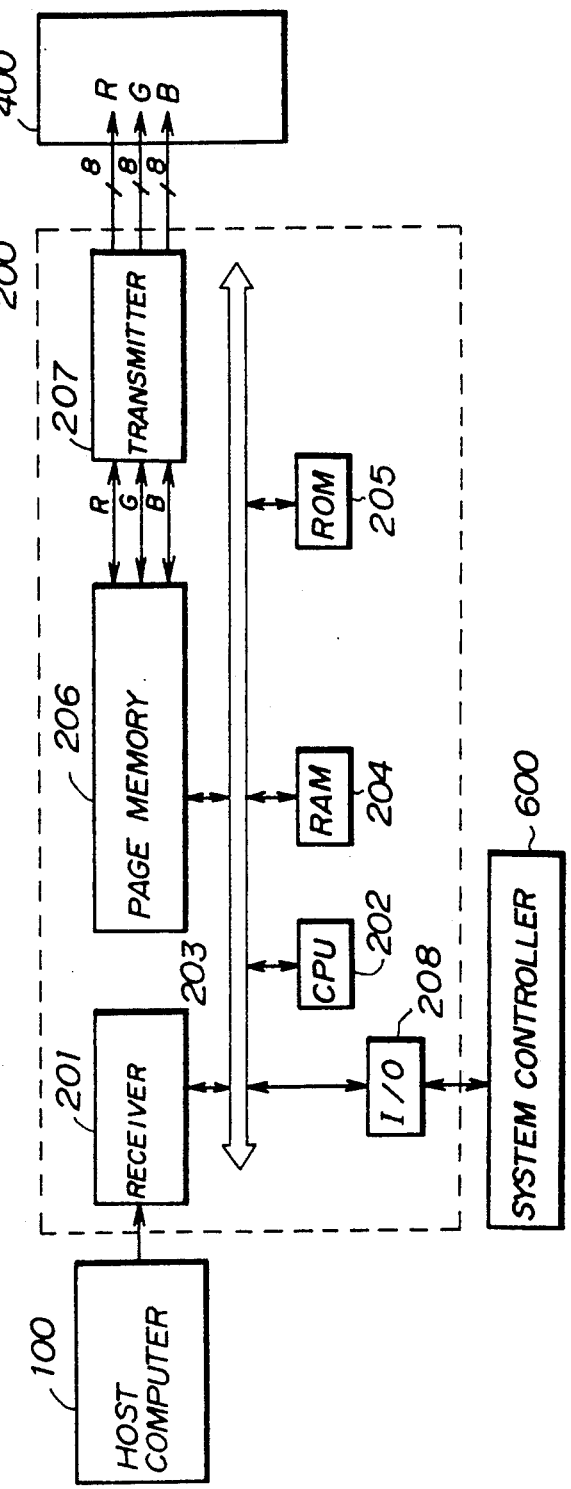
FIG. 9 shows a block diagram of a digital image processor of a second embodiment according to the present invention.

The first digital image 200 according to the present invention comprises, as shown in FIG. 9, a receiver 201, a CPU 202, a system bus 203, a RAM 204, a ROM 205, a page memory 206, a transmitter 207, and an I/O interface. The receiver 201, the CPU 202, the RAM 204, the ROM 205, and the I/O interface 208 are connected to the system bus 203 so as to be connected with each other. The I/O interface is coupled to the system controller 600. The receiver 201 receives the image signal representing the document designed by the outline vector font. The ROM 205 stores therein several programs used for the CPU 202. When the receiver 201 receives the image signal, the image signal is stored in the RAM 204 via the system bus 203. The page memory 206 stores a matrix having matrix elements corresponding to pixels. Since the page memory 206 is connected to the transmitter 207, the digital signal is transmitted from the first digital image processor 200 to the second digital image processor 400 via the transmitter 207. When FIG. 9 is compared with FIG. 4, it is seen that the receiver 201, the transmitter 207 and I/O interface correspond to the communication interface 80, the CPU 202 corresponds to the processor 10, the RAM 204 and ROM 205 correspond to the hard disk 20, and the page memory 206 corresponds to the page memory 30. Therefore, a detailed description thereof be omitted.

Figure 10A:
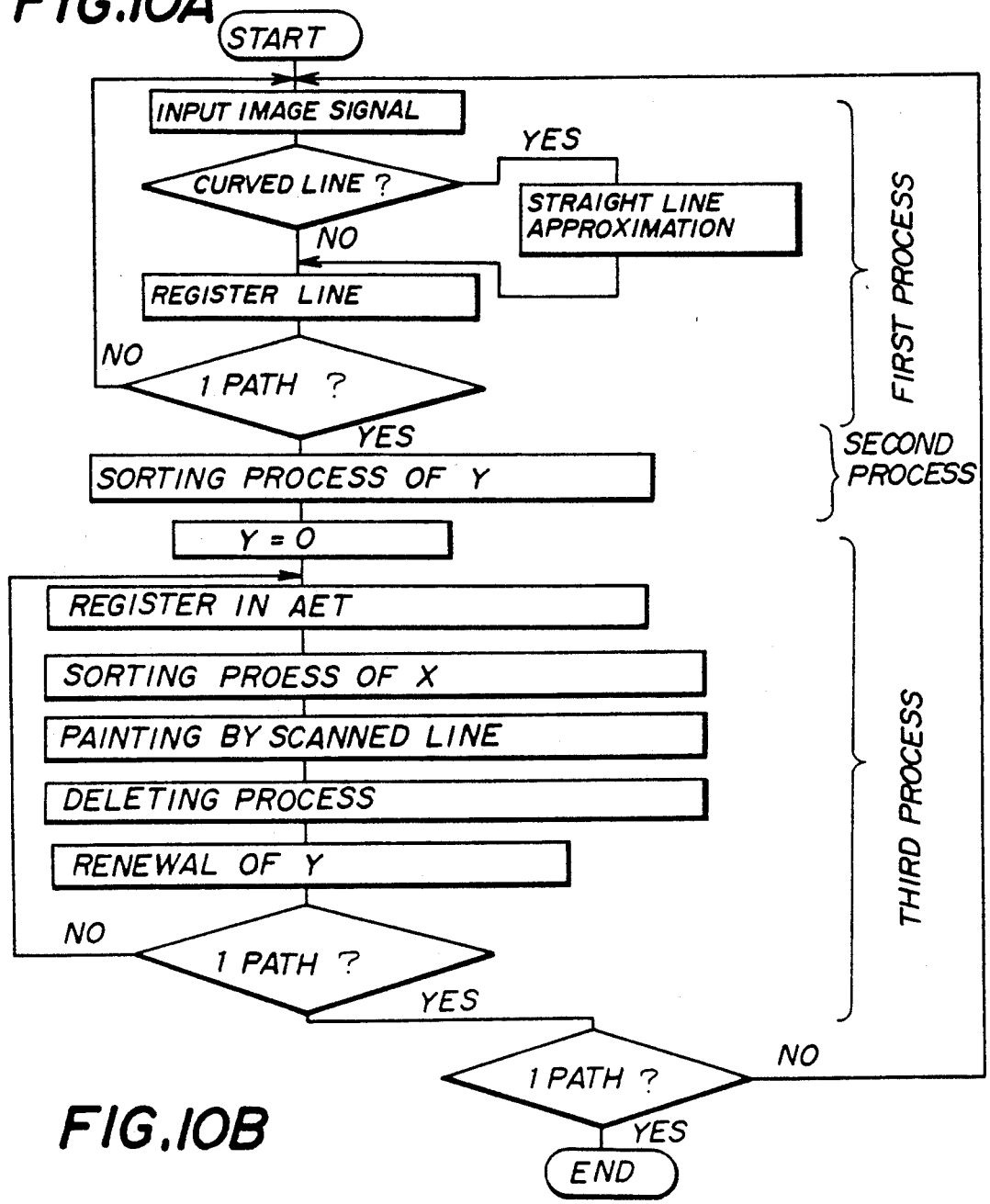
FIGS. 10A to 10C respectively show painting operations performed by a CPU.
Figure 10B:
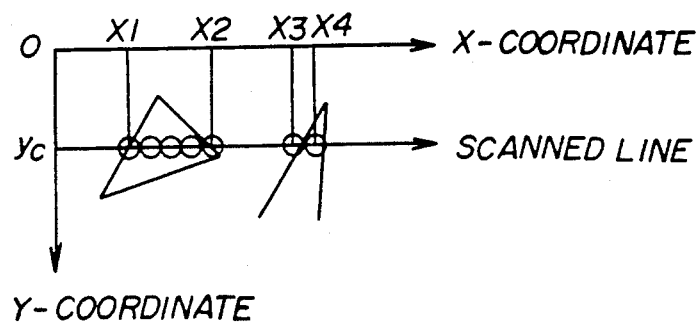
Figure 10C:
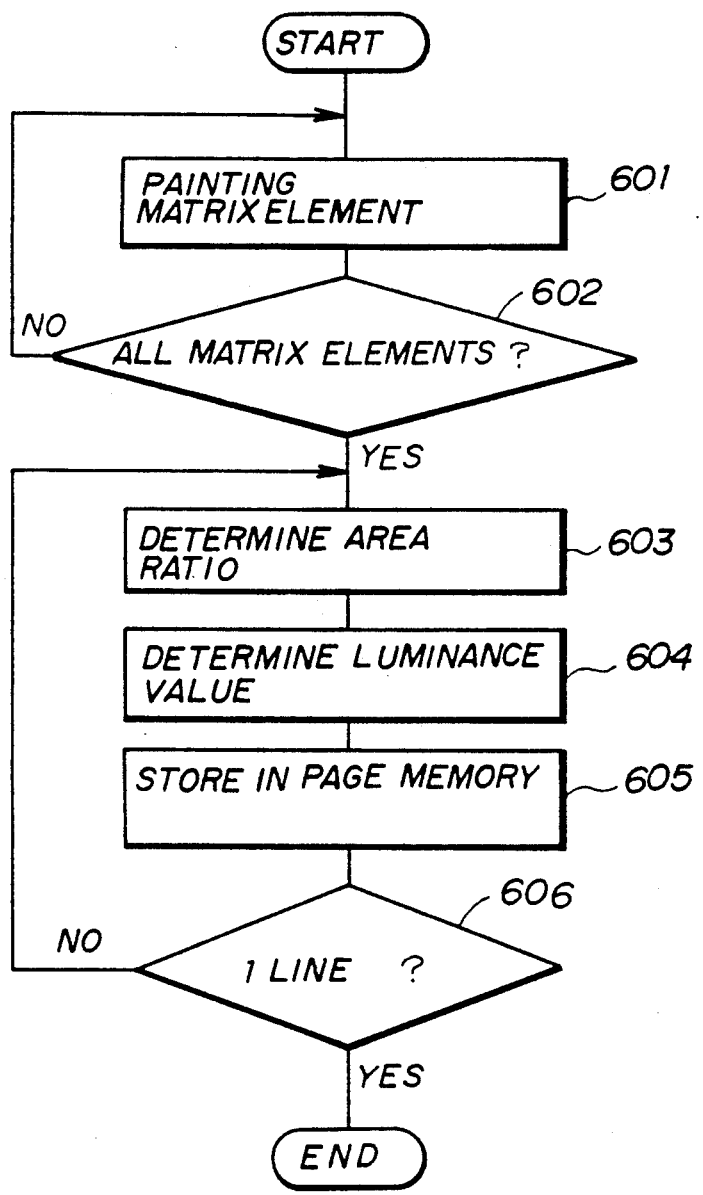

FIGS. 10A to 10C respectively explain a process for the painting the inside demarcated by the outline of the outline vector font with a straight line according to "PIXEL", No.16, January, 1984, Scan-line Conversion (2) concerning Polygon, pp. 136-141, published by the Information Center. Therefore, a detailed description thereof will omitted.

FIG. 10A shows a painting flowchart for processing an image signal representing a page of a document from the host computer 100. The flowchart is roughly divided into three processes. The first process learns a shape of the font, and the second process applies the font to an X-Y coordinate. The third process paints the font in an X-coordinate direction. The characteristic of the second embodiment according to the present invention is included in the painting by a scanned line in the third process.

A description will now be given of the painting by the scanned line with reference to FIGS. 10B and 10C. After the font is applied to the X-Y coordinate, it is assumed that the scanned line extending in the X-coordinate direction at Yc is drawn. Therefore, the scanned line traverses the font at $(X_1, Yc)$, $(X_2, Yc)$, $(X_3, Yc)$, $(X_4, Yc)$. From $X_1$ to $X_4$ are registered in an Active Edge Table (abbreviated AET hereinafter). The term "AET", as used herein, means a memory to store values of the X-coordinate traversed by the scanned line. The values registered in the AET are paired off in an ascending order by a sorting process. In this case, $X_1$ and $X_2$ are paired off, and $X_3$ and $X_4$ are paired off. At last, each interval determined by each pair, for example from $X_1$ to $X_2$, is painted based on the luminance value of a corresponding matrix element which is determined in accordance with the antialiasing process. FIG. 10C shows a flowchart of the painting by the scanned line.

First, a step 601 paints a part of a matrix element corresponding to a subpixel. A pixel is partitioned into 4*4 subpixels. A step 602 performs the painting operation on all matrix elements traversed by the scanned line. Subsequently, a step 603 determines an area ratio of an area covered by the font in a corresponding to matrix element for an area of the corresponding matrix element. A step 604 determines the luminance value of each matrix element. A step 605 stores the luminance value thereof in the page memory 206. A step 606 judges whether or not 1 line of painting is over. If the step 606 judges YES, then the process ends. But, if the step 606 judges No, then the process is transferred to the step 603. The characteristic of the second embodiment is its method for determining the luminance value of each matrix element. In the first embodiment, the luminance value thereof is determined in accordance with the antialiasing process, and corrected by the correction processor 40. But, in this embodiment, the luminance value thereof is determined by taking the correction into consideration. A description will now be given of the determination of the luminance value of each matrix element with reference to FIGS. 11 and 12.

Figure 11C:
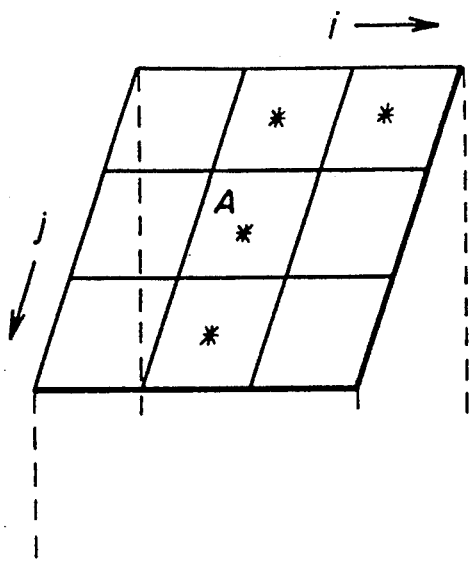
Figure 11B:
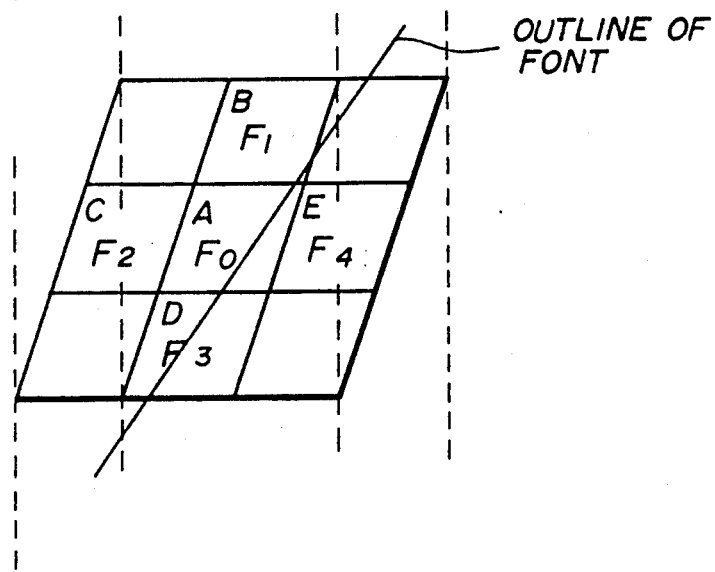
Figure 11A:
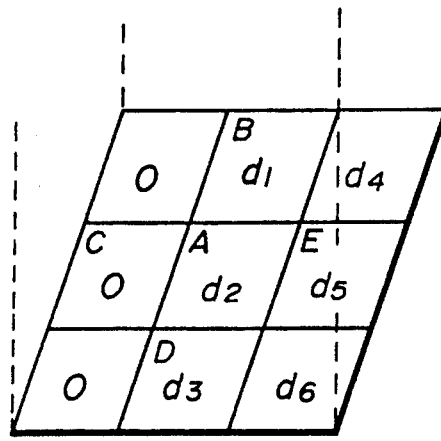

FIG. 11(a) shows a matrix before the outline vector font is drawn thereon. FIG. 11(b) shows a matrix, all of whose matrix elements originally have the luminance value 0, on which the font is drawn. FIG. 11(c) shows a matrix formed by superimposing the matrix in FIG. 11(a) on that in FIG. 11(b). In this case, the image edge part in FIG. 11(c) is emphasized only when the matrix in FIG. 11(a) has an image edge part corresponding to that in FIG. 11(b). This can be understood from the example shown in FIGS. 3(b) to 3(d). In the example, the luminance of the image part and that of the image edge part in a matrix in FIG. 3(b) which corresponds to a matrix in FIG. 11(a) are 100 and 50, respectively. On the other hand, the luminance of the image part and that of the image edge part in a matrix in FIG. 3(c) which corresponds to a matrix in FIG. 11(b) are 10 and 50 respectively. Moreover, the luminance of the image part and that of the image edge part in a matrix in FIG. 3(d) which corresponds to a matrix in FIG. 11(c) are 10 and 30, respectively. In order to prevent the image part in FIG. 11(c) from being emphasized, it is necessary to ignore the luminance value of the image edge part of the matrix in FIG. 11(a) when superimposing the matrix in FIG. 11(b) on it. FIG. 12 shows a flowchart for explaining how the luminance value is determined. A description of the flowchart will now be given with reference to FIG. 11.

First, a step 901 sets a flag $Fn=1$ $(n=1-4)$. Next, a step 902 judges whether or not a predetermined matrix element A belongs to the image edge part of a matrix in FIG. 11(b). If the step 902 judges NO, a step 903 determines the luminance value E of the matrix element A $E_2$ according to the antialiasing process, and a step 909 judges whether or not the luminance values of all the matrix elements have been determined. If the step 909 judges YES, the process ends, however, if the step 909 judges NO, the process is transferred to a step 901.

If the step 903 judges YES, the matrix element A is the image edge part of the matrix in FIG. 11(b). Therefore, whether the matrix element A is the image edge part of the matrix in FIG. 11(a) is subsequently judged. If the step 903 judges YES, a step 904 reads out the luminance values of the matrix element A and the vicinity matrix elements B to E of the matrix in FIG. 11(a). The flags $F_0$ to $F_4$ correspond to the matrix elements A to E, respectively. A step 905 sets each flag responsive to the reading by the step 904 as follows:

If the luminance value of the matrix element is 0, then the step 905 sets the corresponding flag $F_n=0$;

If the luminance value of the matrix element is not 0, then the step 905 sets the corresponding flag $F_n=1$.

Next, a step 906 judges whether or not $F_0*F_1*F_2*F_3*F_4=1$. if the step 906 judges NO, the matrix element A does not belong to the image edge part. Responsive to the step 906, a step 907 calculates the luminance value E of the matrix element A as follows:

$$E=(1-k)*E_2$$

Figure 1A:
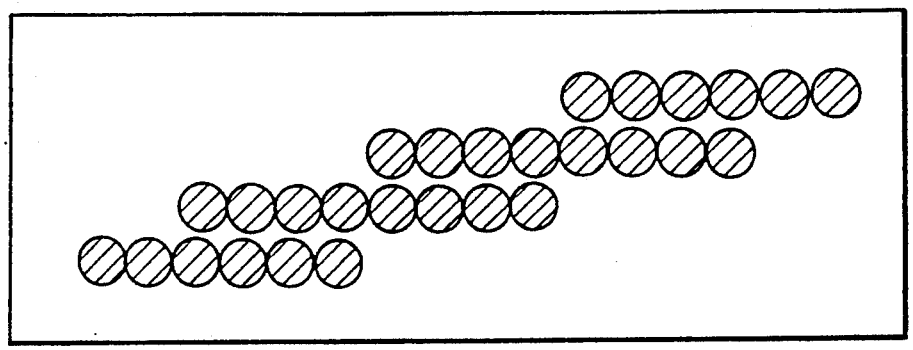
FIGS. 1(A), 1(B), 2, 3(A), 3(B), 3(C) and 3(D) show views for explaining an antialiasing process.
Figure 1B:
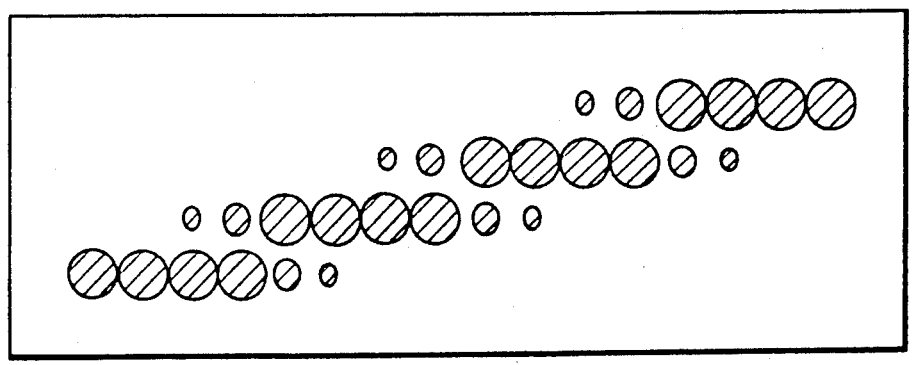
Figure 2:
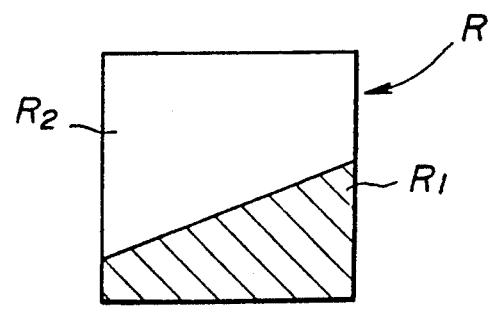
Figure 3A:
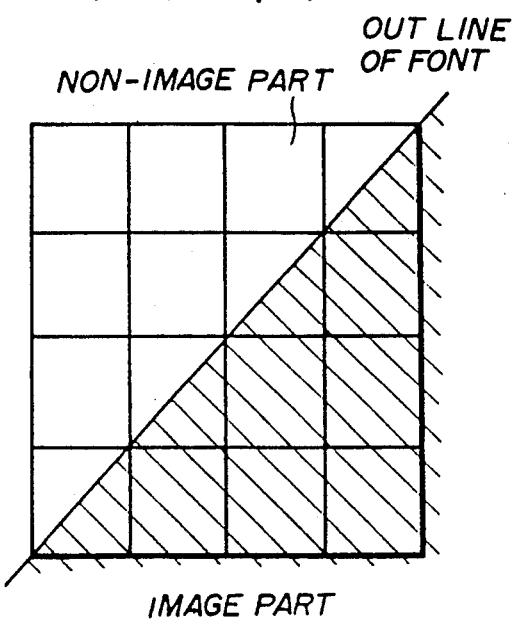
Figure 3B:
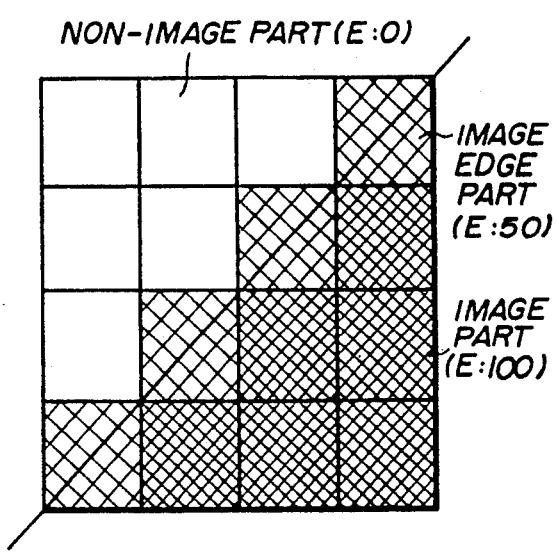
Figure 3C:
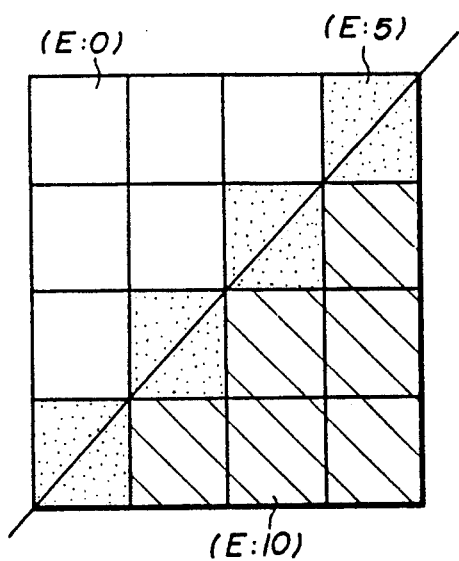
Figure 3D:
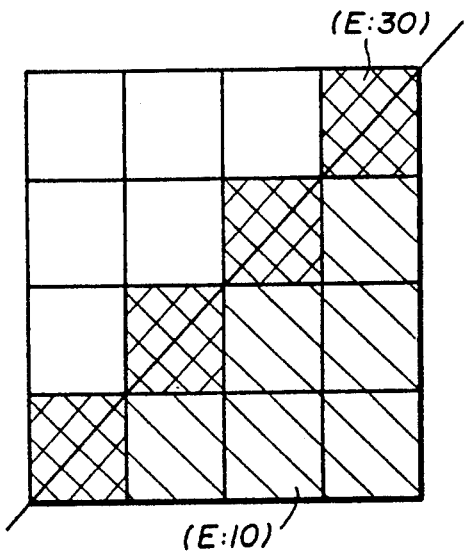

Consequently, if the matrix element A belongs to the image edge part of the matrix in FIG. 3(b), the luminance value thereof is calculated as $E=(1-k)E_2=(1-A_1/(A_1+A_2))*E_2=(\frac{1}{2})*10=5$.

On the other hand, if the step 906 judges NO, the matrix element A belongs to the image edge part. Therefore, a step 908 calculates the luminance value E of the matrix element A as follows:

$$E=k*E_1+(1-k)*E_2$$

Consequently, if the matrix element A belongs to the image part of the matrix in FIG. 3(b), the luminance value thereof is calculated as $E=k*E_1+(1-k)*E_2=E_2=10$.

After the steps 907 and 908, the process is transferred to the step 909.

Thus, according to the present invention, the luminance value Ea of the image edge part is kept lower than that Eb of the image part, or kept higher than that Eb of the image part but lower than that Ec of the non-image part. Therefore, the image edge part is never emphasized.

Further, the present invention is not limited to these embodiments, but various variations and modifications may be made without departing from the scope of the present invention.

What is claimed is:
1. An image processing system, comprising:
 a) means for receiving vector information;
 b) means for converting the vector information into an image signal that includes intensity information;
 c) re-writable memory means for storing the image signal;
 d) means for carrying out an anti-aliasing process with respect to the image signal;
 e) first means for judging whether or not the image signal to be written into the memory means relates to an outline of a graphic formation;
 f) second means for judging whether or not vector information to be written over the image signal describes an outline; and
 g) means for correcting the intensity information of the image signal which is to be written into the memory means, the correcting means ensuring that the edge will not be emphasized, if both the first and second judging means judge that the respective image signal and the vector information to be written describe the outline; wherein the correcting means includes:
 1) means for comparing (i) with (ii) and for comparing (i) with (iii):
  (i) a first intensity of image information that describes an outline of the graphic formation, the first intensity being that which has been subject to the anti-aliasing process;
  (ii) a second intensity related to image information inside the outline of the graphic formation; and
  (iii) a third intensity which has already been written into the memory means in response to previous image information;
 2) means for changing the first intensity in response to the means for comparing, if the first intensity is the highest among the first, second and third intensities, the changing being carried out so that the first intensity is no longer the highest among the first, second and third intensity; and
 3) means for writing the first intensity into the memory means if the first intensity has been corrected by the changing means, so that the digital signal is corrected in a manner so as to prevent the outline from being emphasized.

2. A digital image processor for generating a digital signal in response to an image signal representing a outline-demarcated graphic formation, the digital image processor comprising:
 a) means for receiving the image signal;
 b) a bit map memory for storing intensity values respectively corresponding to pixels in a representation of the graphic formation;
 c) means for generating the digital signal, wherein the digital signal determines the intensity of each pixel;
 d) means, coupled to the means for receiving, for:
  (1) calculating matrix element magnitudes for use in an anti-aliasing process, and
  (2) carrying out the anti-aliasing process on image information that describes an outline of the graphic formation; and
 e) means, coupled to the bit map memory, for correcting the digital signal, the means for correcting the digital signal including:
 1) means for comparing (i) with (ii) and for comparing (i) with (iii):
  (i) a first intensity of image information that describes an outline of the graphic formation, the first intensity being that which has been subject to the anti-aliasing process d)2);
  (ii) a second intensity related to image information inside the outline of the graphic formation; and
  (iii) a third intensity which has already been written into the bit map memory in response to previous image information;
 2) means for changing the first intensity in response to the means for comparing, if the first intensity is the highest among the first, second and third intensities, the changing being carried out so that the first intensity is no longer the highest among the first, second and third intensity; and
 3) means for writing the first intensity into the bit map memory if the first intensity has been corrected by the means for changing, so that the digital signal is corrected in a manner so as to prevent the outline from being emphasized.

3. The digital image processor of claim 2, wherein: the graphic formation is an outline vector font.

4. The digital image processor of claim 2, wherein the means for correcting the digital signal includes means for replacing the value of the first intensity with the value of the third intensity.

5. A digital image processor for generating a digital signal in response to an image signals having image information representing first and second outline-demarcated graphic formations, the digital image processor comprising:
   a) means for receiving the image signals having image information;
   b) a bit map memory for storing intensity information formed as intensity values respectively corresponding to pixels in a representation of the graphic formation;
   c) means for generating the digital signal, wherein the digital signal determines the intensity of each pixel;
   d) means, coupled to the means for receiving, for:
      (1) calculating matrix element magnitudes for use in an anti-aliasing process, and
      (2) carrying out the anti-aliasing process if the image information from the means for receiving describes the outline of the graphic formation; the anti-aliasing process being carried out with respect to:
         1) the image information from the means for receiving, as well as the intensity information previously stored in the bit map memory, if the intensity information previously stored in the bit map memory does not describe the outline of the graphic formation; or
         2) the image information from the means for receiving but not the intensity information previously stored in the bit map memory, if the intensity information previously stored in the bit map memory does not describe the outline of the graphic formation; and
   e) correction means for writing to the bit map memory:
      1) the image information if the image information from the means for receiving does not describe the outline of the graphic formation; or
      2) output information from the means for carrying out the anti-aliasing information;
   so that the digital signal is corrected in a manner so as to prevent the outline from being emphasized.

6. The digital image processor of claim 5, wherein: the graphic formation is an outline vector font.

7. The digital image processor of claim 5, wherein:
   A) the means for calculating includes means for calculating the intensity of a predetermined matrix element by using an intensity value E representing the intensity, if the predetermined matrix element does not traverse both respective outlines of the first and second graphic formations, wherein:

$$E = k^* E_1 + (1-k)^* E_2; \text{ and}$$

B) the means for calculating includes means for calculating the intensity thereof if the predetermined matrix element traverses respective outlines of both the first and second graphic formations, wherein:

$$E = (1-k)^* E_2;$$

wherein:
   $E_1$ is an intensity value of the predetermined matrix element on which the first graphic formation is drawn;
   $E_2$ is an intensity value of the second graphic formation; and
   k is an area ratio determined in accordance with the anti-aliasing process.

* * * * *